(12) United States Patent
Kalayjian et al.

(10) Patent No.: US 9,558,141 B2
(45) Date of Patent: Jan. 31, 2017

(54) SYSTEM AND METHOD FOR ACCESSING A USER INTERFACE VIA A SECONDARY DEVICE

(71) Applicant: UNIVERSAL ELECTRONICS INC., Santa Ana, CA (US)

(72) Inventors: Nicholas Kalayjian, San Carlos, CA (US); David Isbister, San Francisco, CA (US); Michael Hirsch, Huntington Beach, CA (US)

(73) Assignee: Universal Electronics Inc., Santa Ana, CA (US)

( * ) Notice: Subject to any disclaimer, the term of this patent is extended or adjusted under 35 U.S.C. 154(b) by 196 days.

(21) Appl. No.: 14/283,595

(22) Filed: May 21, 2014

(65) Prior Publication Data

US 2015/0019783 A1 Jan. 15, 2015

Related U.S. Application Data

(63) Continuation of application No. 11/495,076, filed on Jul. 28, 2006, now abandoned.
(Continued)

(51) Int. Cl.
*G06F 17/00* (2006.01)
*G06F 13/40* (2006.01)
(Continued)

(52) U.S. Cl.
CPC ......... *G06F 13/4068* (2013.01); *G06F 1/1632* (2013.01); *G06F 3/0227* (2013.01);
(Continued)

(58) Field of Classification Search
CPC .... G06F 1/1632; G06F 3/0227; G06F 3/0481; G06F 13/4068; G06F 13/36; H04N 5/602; H04N 5/4403; H04N 5/44513; H04N 21/414; H04N 21/602; H04N 21/4122; H04N 21/4126; H04N 21/4184; H04N 21/42206; H04N 21/42207; H04N 21/42221; H04N 21/42228; H04N 21/43632
(Continued)

(56) References Cited

U.S. PATENT DOCUMENTS 5,990,882 A * 11/1999 Heinonen .......... H04N 7/17309
348/E7.07
6,216,185 B1 * 4/2001 Chu ...................... G06F 1/1632
710/303
(Continued)

OTHER PUBLICATIONS

ID3v2 Draft Specification; copyright Mar. 1998.*

*Primary Examiner* — Paul McCord
(74) *Attorney, Agent, or Firm* — Greenberg Traurig, LLP

(57) ABSTRACT

An adapter provides a link between a digital media player having a memory on which is stored digital media files, a display device, and a remote control. The adapter receives from the digital media player data which is used to generate a representation of a user interface which is provided to the display device for display. The adapter also receives from the remote control data for use in generating commands for controlling operations of the digital media player whereby a change in state of the digital media player resulting from a performance of an operation caused by the remote control will be reflected in the user interface on the display device.

12 Claims, 7 Drawing Sheets

Related U.S. Application Data

(60) Provisional application No. 60/704,376, filed on Aug. 1, 2005.

(51) Int. Cl.
  *G06F 1/16* (2006.01)
  *G06F 3/02* (2006.01)
  *G06F 3/0481* (2013.01)
  *H04N 5/445* (2011.01)
  *H04N 5/60* (2006.01)
  *H04N 21/41* (2011.01)
  *H04N 21/414* (2011.01)
  *H04N 21/418* (2011.01)
  *H04N 21/422* (2011.01)
  *H04N 21/4363* (2011.01)
  *G06F 13/36* (2006.01)
  *H04N 5/44* (2011.01)

(52) U.S. Cl.
  CPC ............ *G06F 3/0481* (2013.01); *G06F 13/36* (2013.01); *H04N 5/44513* (2013.01); *H04N 5/602* (2013.01); *H04N 21/414* (2013.01); *H04N 21/4122* (2013.01); *H04N 21/4126* (2013.01); *H04N 21/4184* (2013.01); *H04N 21/42206* (2013.01); *H04N 21/42207* (2013.01); *H04N 21/42226* (2013.01); *H04N 21/43632* (2013.01); *H04N 5/4403* (2013.01); *H04N 21/42221* (2013.01)

(58) Field of Classification Search
  USPC .............................. 700/94; 710/300, 303, 304
  See application file for complete search history.

(56) References Cited

U.S. PATENT DOCUMENTS

| | | | | |
|---|---|---|---|---|
| 6,703,940 | B1 * | 3/2004 | Allen | G08C 19/28 340/12.27 |
| 7,027,768 | B2 * | 4/2006 | Hill | H04M 1/725 348/E5.002 |
| 7,103,381 | B1 * | 9/2006 | Wright | H04M 1/6083 455/556.1 |
| 7,155,214 | B2 * | 12/2006 | Struthers | H04H 20/63 455/2.01 |
| 7,363,002 | B2 * | 4/2008 | Hill | H04M 1/725 348/E5.002 |
| 7,689,197 | B2 * | 3/2010 | Laude | G11B 17/0405 181/198 |
| 2002/0132651 | A1 * | 9/2002 | Jinnouchi | H04B 1/3888 455/573 |
| 2003/0160890 | A1 * | 8/2003 | Caspe | H04N 1/00283 348/372 |
| 2004/0150944 | A1 * | 8/2004 | Byrne | H02J 7/0044 348/207.99 |
| 2004/0151327 | A1 * | 8/2004 | Marlow | G11B 27/002 381/86 |
| 2004/0201774 | A1 * | 10/2004 | Gennetten | H04N 1/00127 348/375 |
| 2005/0013103 | A1 * | 1/2005 | Chandley | G06F 1/1632 361/679.41 |
| 2005/0185364 | A1 * | 8/2005 | Bell | G06F 3/0488 361/679.41 |
| 2005/0239434 | A1 * | 10/2005 | Marlowe | G11B 19/025 455/345 |
| 2006/0039263 | A1 * | 2/2006 | Trotabas | B60R 11/02 369/86 |
| 2006/0046780 | A1 * | 3/2006 | Subramaniam | H04R 5/02 455/557 |
| 2006/0149399 | A1 * | 7/2006 | Norhammar | G11B 27/034 700/94 |
| 2006/0250764 | A1 * | 11/2006 | Howarth | G06F 1/1632 361/679.41 |
| 2006/0274910 | A1 * | 12/2006 | Schul | H04R 5/02 381/334 |
| 2007/0010195 | A1 * | 1/2007 | Brown | H04H 60/73 455/3.06 |
| 2007/0070183 | A1 * | 3/2007 | Davis | H04M 1/72527 348/14.02 |
| 2007/0101039 | A1 * | 5/2007 | Rutledge | G06F 1/1632 710/303 |
| 2008/0138028 | A1 * | 6/2008 | Grady | H04N 1/00299 386/291 |
| 2009/0109183 | A1 * | 4/2009 | Carvajal | G06F 3/0416 345/173 |
| 2010/0184479 | A1 * | 7/2010 | Griffin, Jr. | H04B 1/034 455/557 |
| 2011/0035431 | A1 * | 2/2011 | Geary | G06F 17/30899 709/203 |

* cited by examiner

SYSTEM AND METHOD FOR ACCESSING A USER INTERFACE VIA A SECONDARY DEVICE

RELATED APPLICATION INFORMATION

This application claims the benefit of and is a continuation of U.S. application Ser. No. 11/495,076, filed on Jul. 28, 2006, which application, in turn, claims the benefit of U.S. application Ser. No. 60/704,376, filed on Aug. 1, 2005, the disclosures of which are incorporated herein by reference in their entirety.

BACKGROUND

A described adapter device provides both remote control and a graphical user interface on a television or other secondary viewable screen for accessing, controlling, and browsing the contents of a device that does not have built in remote control or television user interface capabilities. The attached second device could be, for example, a portable digital media player such as an Apple iPod® or the like.

Using the Apple iPod® as an example (but understanding that the principles described are broadly applicable to portable media player devices in general), the iPod® has a serial communications interface on a connector located on the bottom of the device. This communications interface can receive input commands for actions such as play/pause, left, up, select, etc. The communications interface can also send text information that mimics the information displayed on the iPod® LCD. This interface is provided to allow external devices to control playback of media stored within the iPod®. For example, automobile manufacturers may offer integration kits that use the serial protocol to connect steering wheel or dashboard buttons to the iPod® and to also display iPod® player and browsing interface text on a secondary dash mounted display.

It is also known to offer add-on IR remote controls that can be used to control an iPod® from a distance, often in combination with a docking station which facilitates connecting the analog music outputs of the iPod® to a conventional stereo receiver, etc.

The market for accessories for portable media player devices is very large. In this arena, the iPod® portable media player is currently the number one portable media player at the time of writing and will thus be used by way example in the detailed descriptions that follow. It will nevertheless be understood and appreciated that the principles expressed herein are broadly applicable to any media player device in general which is capable of receiving control information and outputting information related to media being played on the device.

As noted, there are several existing accessories that allow an iPod® to be connected to a home stereo system, but they add nothing to the functionality of the device and are basically just cables or passive docks for cable management. There are also remote control devices, but they only offer basic playback control, no browsing of the content stored within the iPod® is possible.

There is thus no product in the market that connects an iPod® to a TV or other display screen for the purpose of rendering the text serial interface data on a TV screen such that it is readable from a distance. The iPod® Photo model connects to a TV for photo display, but not for browsing with a remote. There are also no products in the market today that provide both an enhancement of the iPod® display as well as a wireless remote control.

Accordingly, a need exists for an adapter device which allows a user to remotely access, browse, and control a portable media player using an IR remote and a television or other display screen.

SUMMARY

Portable media players, such as the exemplary Apple iPod®, are often built with only buttons and a small screen for access, browsing, and controlling playback of media. When the portable media player is provided with a secondary method for control input and display output such as a serial port, the player may be used with a dock to enhance the user experience.

The proposed adapter device can be implemented as a dock that the media player rests in, as a standalone box connected to the media player via a cable, or as a built in component of another appliance such as a stereo receiver, media renderer, DVR, and the like.

The adapter device (which for convenience may on occasion hereafter be simply referred to as a "dock," with the understanding that such a device may also be implemented as a standalone box, cable, recharging station add-on, built-in component, etc.) comprises a CPU capable of generating a television display signal and a receiver for accepting input from a wireless remote. When a user presses a button on the associated remote control, the adapter device receives the IR, translates it into the serial protocol used by the portable media player and transmits the message to the portable media player. The portable media player sends a message to the adapter device stating that the display interface has changed, and the adapter device updates the data displayed on the TV.

DETAILED DESCRIPTION

Figure 1:
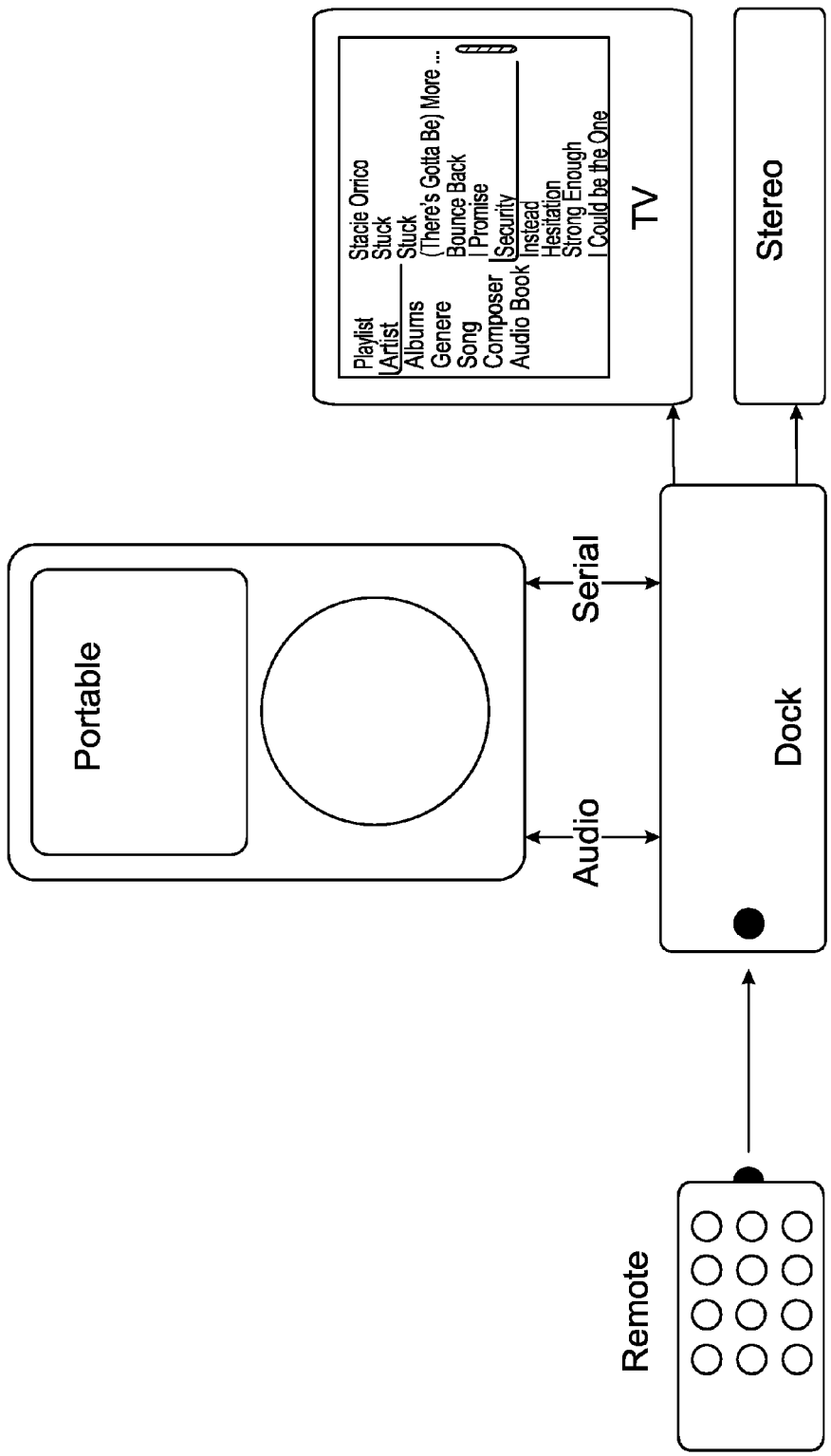
FIG. 1 illustrates an exemplary basic implementation, showing the connections between the various components of one system embodying the inventive concepts.

By way of example only, FIG. 1 shows a basic implementation and the connections between the various components of a system in which the principles of the invention may be practiced. In this illustrated scheme, the serial interface is narrow bandwidth and does not support interface elements such as album artwork. In this case a higher bandwidth interface such as USB may be useful.

Figure 2:
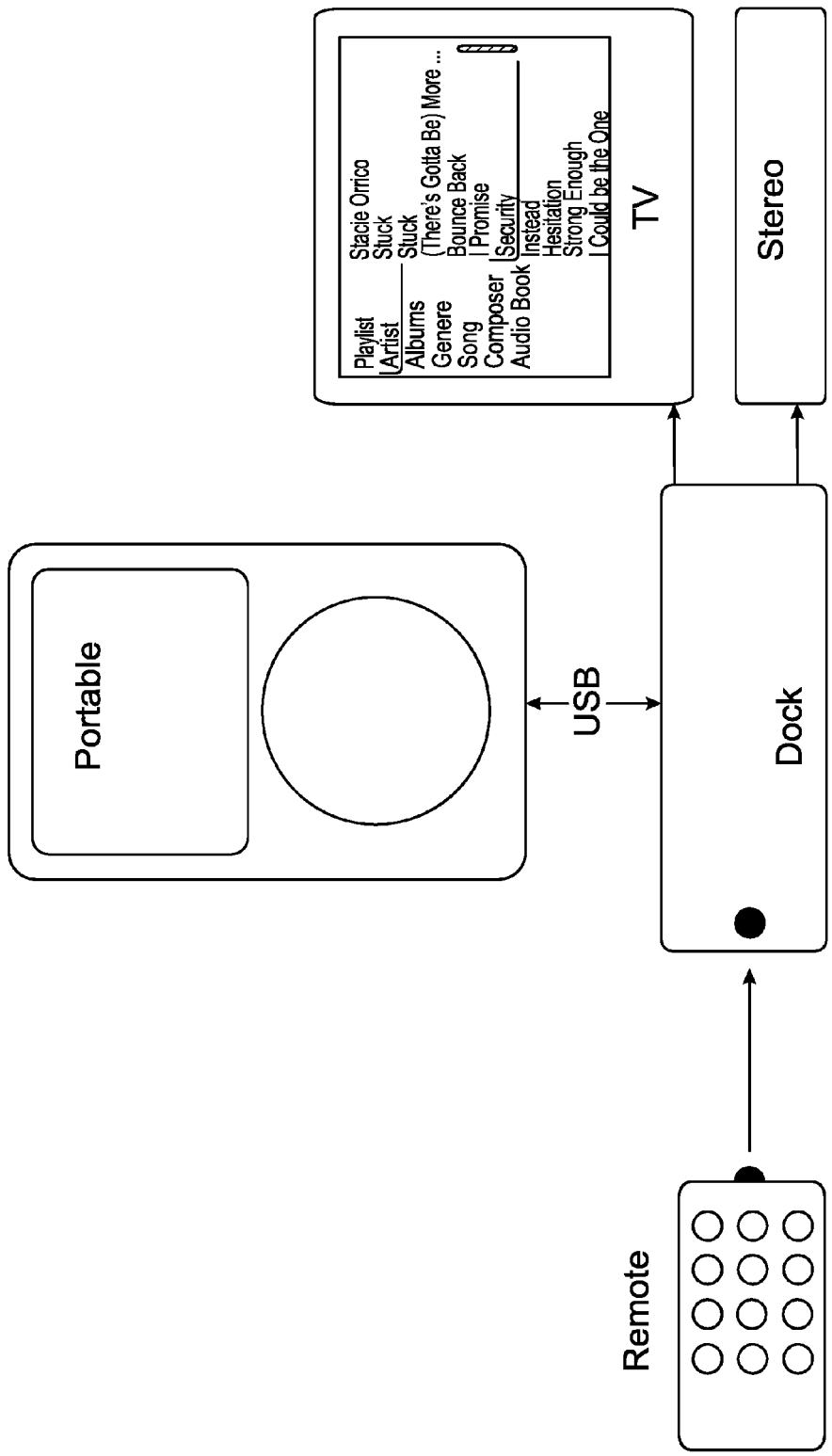
FIG. 2 illustrates an alternative exemplary implementation, showing the connections between the various components of a system embodying the inventive concepts.

FIG. 2 shows an implementation where the portable media player is connected to the dock via USB. In this model the dock has a USB host controller and can access the native music files and extract album art to display on the TV. One aspect of this approach not yet supported by currently available technologies is that the files must be decoded on the dock CPU which may not support media copy controls or digital rights management systems such as Microsoft Janus for WMA files. In a system where the files can be sent over USB to the dock as uncompressed audio, the USB solution would be equivalent to the basic implementation shown in FIG. 1.

Figure 3:
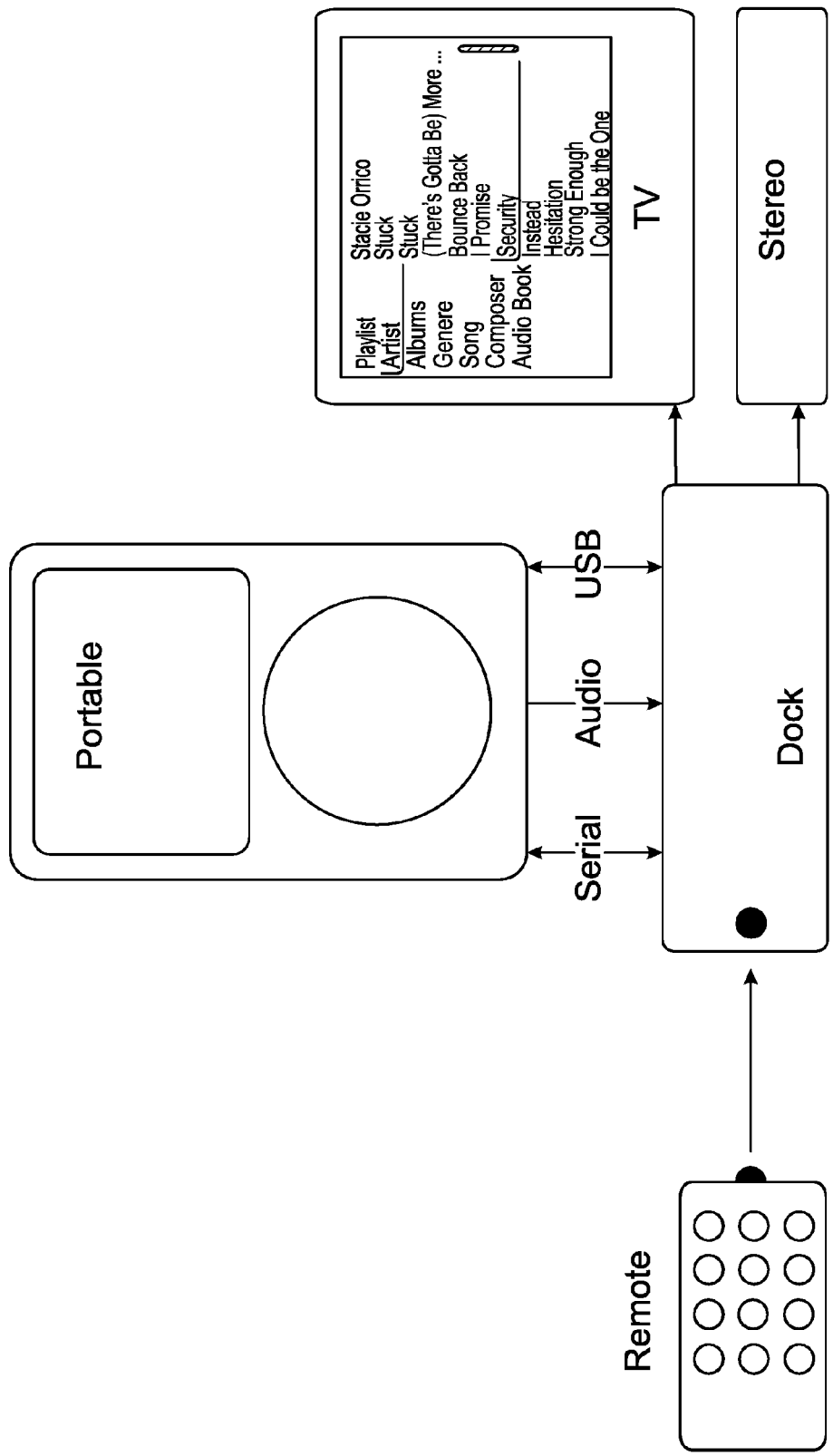
FIG. 3 shows yet another alternative exemplary implementation and the connections between the various components of a system embodying the inventive concepts.
Figure 4:
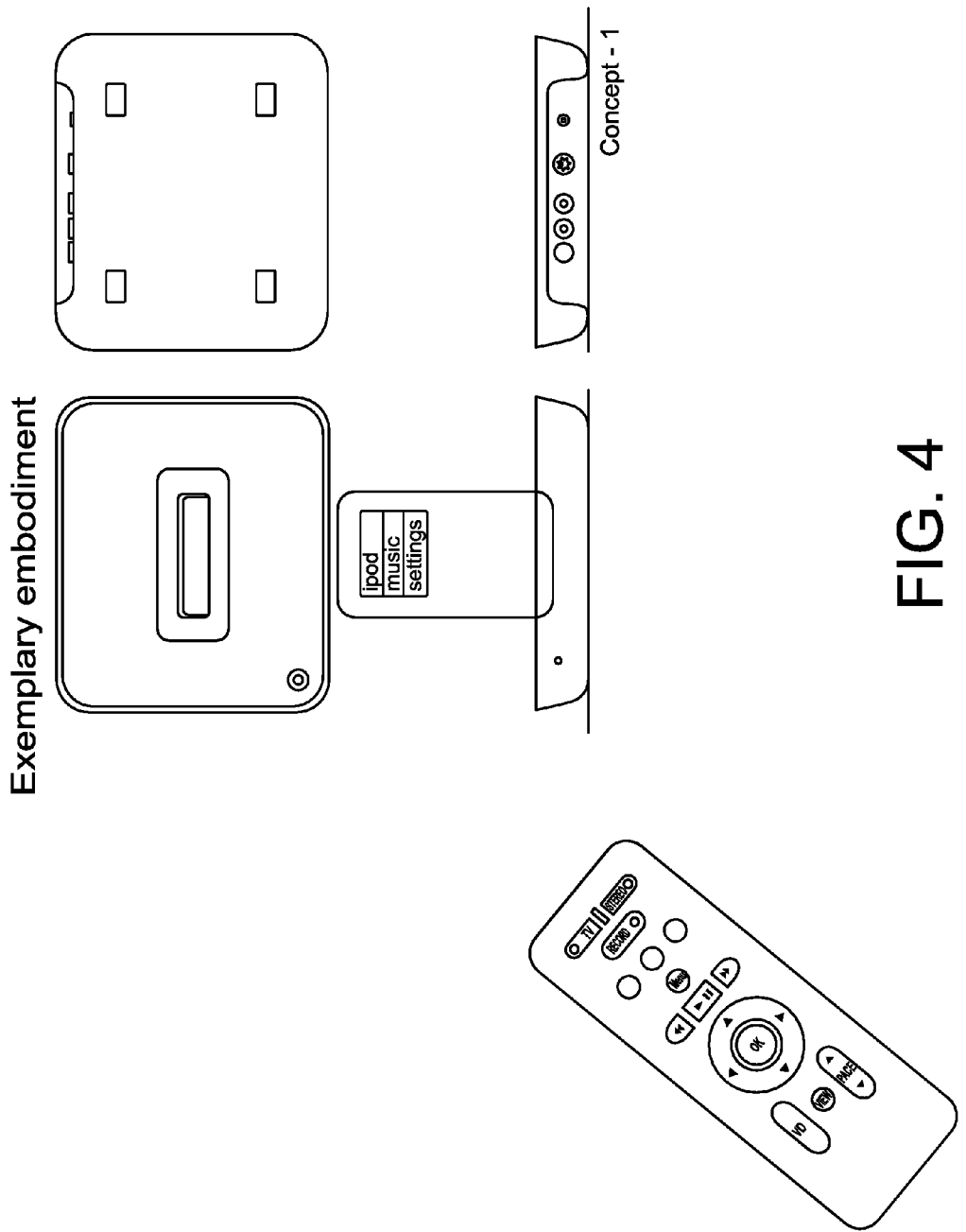
FIG. 4 illustrates the physical appearance of an exemplary docking and recharging station incorporating an adapter device in accordance with the invention.

FIG. 3 addresses both issues and provides both a serial and USB interface. When the device is placed in the dock, the USB is active and album art for all tracks is extracted and stored in the dock. After all artwork is cached in the dock, the USB is disabled and the serial interface is used to browse and control the portable media player. When the user selects a track to play, the dock CPU finds the correct album art and displays it along with the other track information on the TV. This embodiment assumes that both the serial interface and USB interface do not operate simultaneously, as is the case with the currently available Apple iPod® players. Flash memory in the dock could be used to store the album art so that the synchronization would not be required each time the iPod® was docked. A button could allow a user to select when the dock performed the synchronization of artwork to the dock.

Since the time required to transfer the album art to the dock could be substantial (for example, in the case of a large hard disk based portable media playback device, parsing and extracting album art from 60 GB of media files could take tens of minutes to process), the dock may include an embedded or user upgradeable library of album art that could be matched to songs on the portable media player based on title, artist, etc. This would eliminate the requirement for a USB or other high speed digital link into the portable media player.

Alternatively or in conjunction with the above feature the dock may also include a network connection that could search a remote database for album art as well as other ancillary information such as local concerts based on the album, artist, title, etc. data that is received from the serial link on the portable media player.

The dock may also include Flash memory card slots (CF Card, SD Card, MemoryStick, etc.) for showing photos or storing album art for the music playing on the portable media player.

The adapter device may also leverage the TV UI for programming a universal remote control. The dock CPU may be adapted to display a list of brands or models of TV, Stereo, etc and together with the correct codes for programming the remote. The dock may also send an IR command to a learning remote for programming the remote. The dock may also have a connector for transferring configuration data to the remote via a wired connection.

The associated remote control may include buttons for preset songs, playlists, modes, etc on the portable media player, when the dock receives a command corresponding to one of these buttons it could automatically cause the portable media player to jump to the indicated function. These presets might for example be programmed into the dock by pressing a program button on the remote control or holding down a preset button on the remote control for several seconds. The preset buttons may also be located on the dock (either individually or as duplicates of the remote control button functions) for use without a remote control.

One alternate embodiment may use an IR blaster on the dock to control the TV and stereo. This would permit the use of a less expensive remote control, while still providing remote control of other devices. This design would also allow the dock to execute macros for automating tasks such as turning on both the TV and stereo when the portable media player is turned on.

The dock could also be a charging station for the portable media player.

By way of further detailed example, an exemplary product embodiment (hereafter referred to as the "MediaPod") is now described.

The MediaPod allows a user to dock their iPod® and use a remote control to browse the contents of the iPod® on the television and control playback of music through the stereo. The dock connects to the iPod® using a cradle connector and the "Apple Accessory Protocol" which is a serial interface for controlling the browse and playback functions of the iPod®. Audio is decoded and converted to analog in the iPod®, and routed from the analog output pins of the cradle connector through the dock to the home stereo system. Any music available on the iPod®, including FairPlay DRM protected files, can be played using the dock. The iPod® is also charged while on the dock.

The design intent is to produce a low cost device without networking, internal audio processing, USB, etc., though as will be appreciated by those of ordinary skill in the art, such hardware may be added as desired in alternative designs, as necessary to support the extended features previously described.

Figure 5:
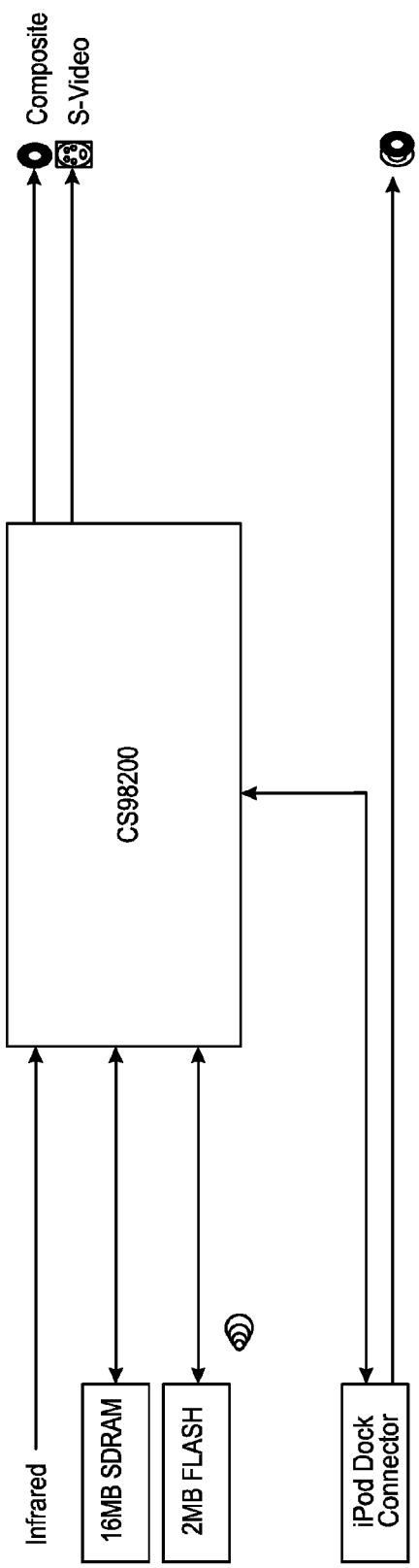
FIG. 5 illustrates an exemplary electrical architecture of an adapter device, in block diagram form.
Figure 6:
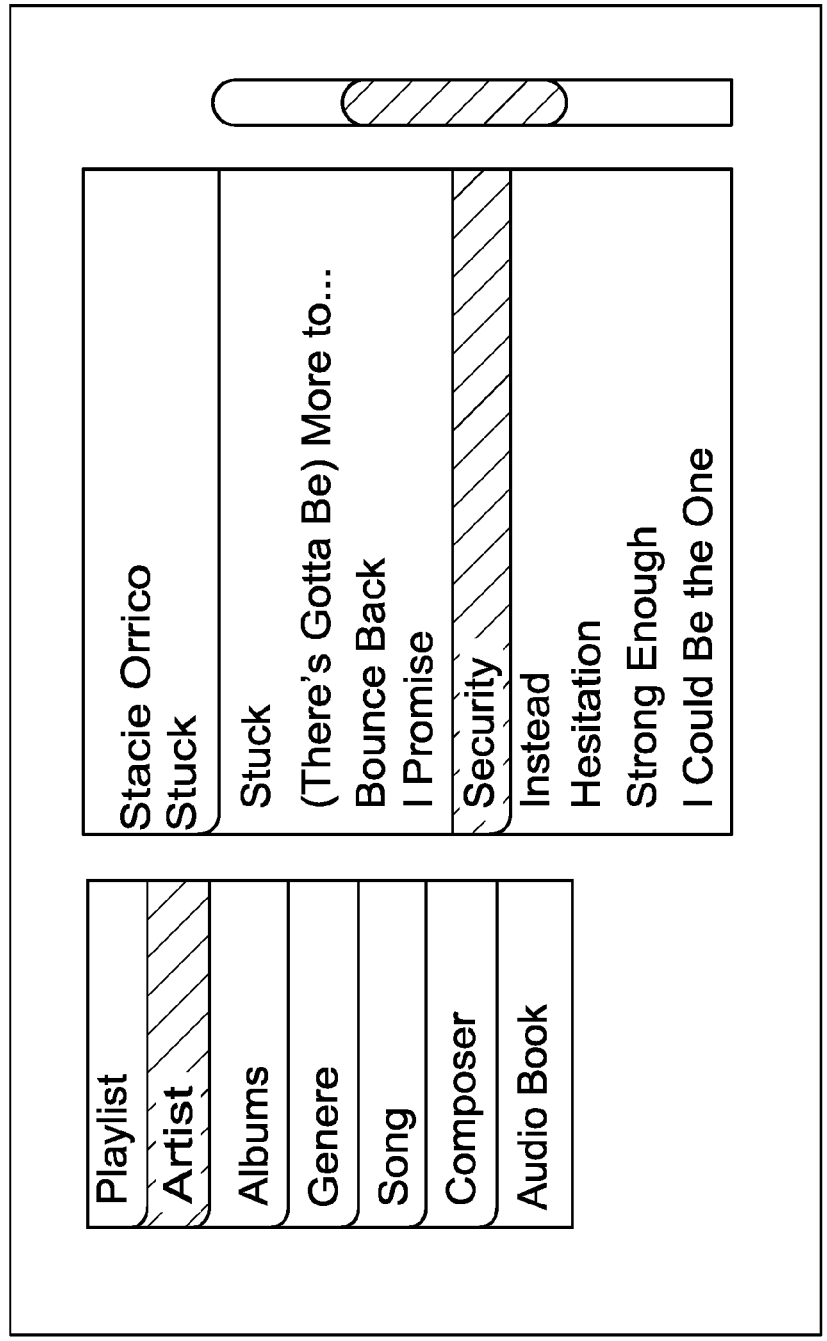
FIG. 6 illustrates an exemplary TV screen display representative of browsing the stored content of a docked portable media player device.
Figure 7:
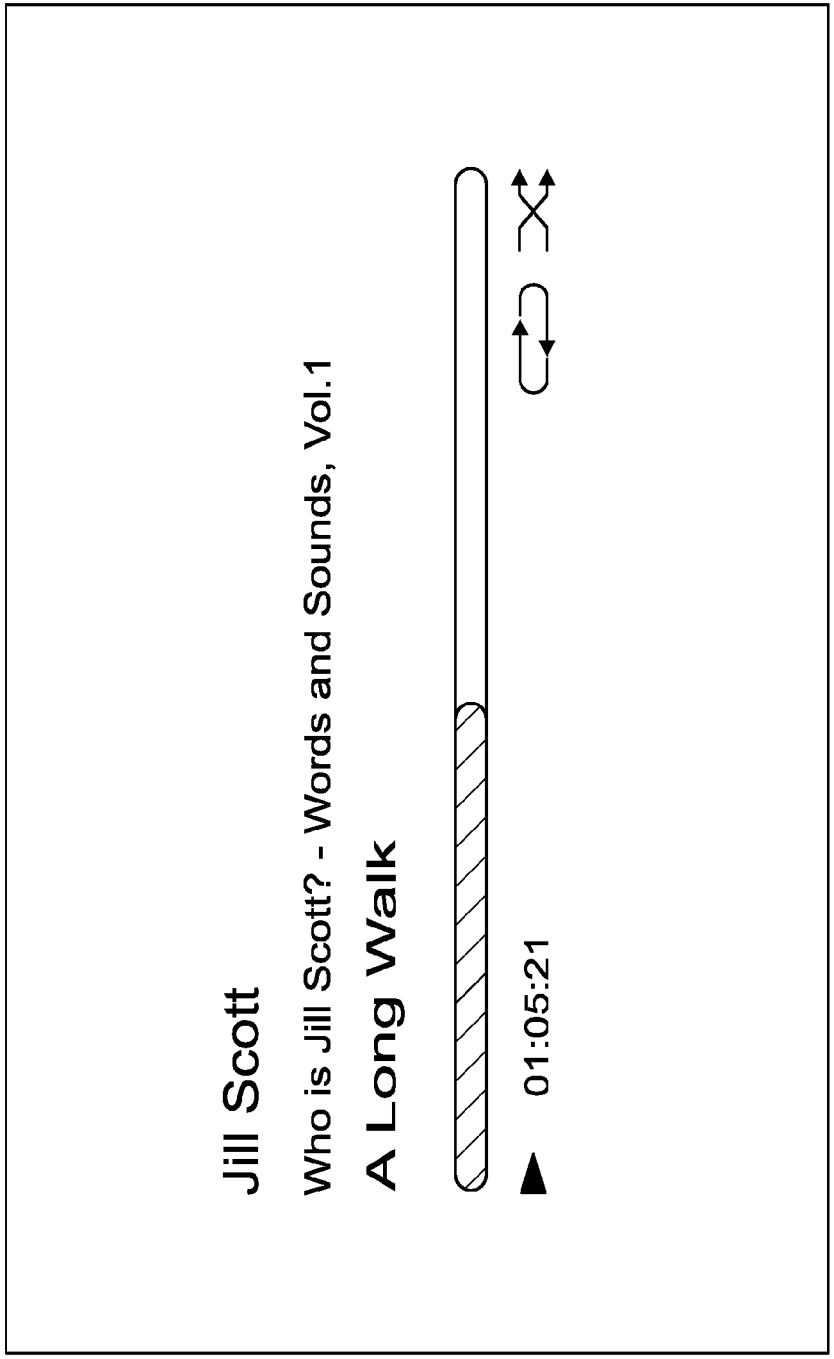
FIG. 7 illustrates an exemplary TV screen display representative of playing back content from a docked portable media player device.

The major components of the product are as follows: An enclosure which houses the main computer board responsible for generating the TV UI and controlling the iPod®, a LED (or other visual feedback device) to indicate power and IR receiver status, a barrel jack connector for power/charging input, an iPod® docking connector, audio and video output jacks (for example, RCA style), an S-Video output jack, and an IR Receiver. The electrical architecture of this main element is illustrated in FIG. 5. Additionally, an AC adapter wall-brick (output may for example be 5 VDC, 1.2 A) is provided to be connected via the barrel jack to provide battery charging and power for the main computer board and accessories, and an infrared remote control is provided to transmit command signals to the main enclosure (iPod® dock), and also to perform basic TV and stereo control functions. These elements are described in further detail below.

The main computer board comprises a microprocessor, flash and RAM memory, as well as the necessary glue circuitry to accommodate the various interfaces. The microprocessor may preferably include integrated video processing capabilities, such as for example the CS98200 available from Cirrus Logic Inc. Firmware programming for implementing the operational functions described and user interface (described in more detail later) may run for example under the Nucleus OS provided by Cirrus logic, and leverage the Sonata development platform. The Apple Accessory Protocol may be used to communicate with and control the docked device.

Audio output format is standard analog stereo via conventional red/white RCA jacks. Video output is 480×720, interlaced in either NTSC or PAL (factory selected according to shipping destination) via either composite (yellow RCA jack) or S-Video (Mini-Din).

The main enclosure may also include a power button for turning the MediaPod on and off, as well as a green LED which will be illuminated when the MediaPod is "on". When the cradle is powered "off" (but still has power through the wall adapter), the green LED will be off even though the iPod® will be charging whenever it is docked in the main enclosure—regardless of whether the MediaPod is on or off (Charging status will be displayed on the iPod® screen.)

The iPod® controls will be disabled when docked.

The provided simple remote control is equipped with buttons to mimic the iPod® user interface as well as to provide basic TV and stereo control capabilities. By way of example, the following buttons may be provided:
iPod® dock dedicated buttons:
  MediaPod power
  Up, down, left, right, ok
  Menu
  Page up, page down
  Play/Pause, Skip+, Skip−
TV dedicated buttons
  TV power
  TV input
Stereo dedicated buttons
  Stereo power
  Stereo input
Stereo OR TV dedicated buttons
  Vol+, Vol−, Mute
Non-IR transmitting keys
  Setup The remote control may also have a LED for user feedback. This is used to signify when the remote control is in setup mode and also to provide a visual indicator when the batteries need replacement. During normal operation, the LED will illuminate when a key is pressed; during setup, the LED will serve to provide user feedback as is well known in the art, see for example U.S. Pat. No. 6,720,904, of like assignee which is incorporated herein by reference in it's entirety. Low battery status may for example be indicated by a series of flashes every time a key is pressed, as is also well known in the art.

The user interface may include all text-based UI elements available on the iPod® LCD. In this exemplary embodiment, there may not be any way to show album art on the TV because the connection to the iPod® is only serial and audio. The user interface, however, may include some generic graphical elements in order to make the GUI as engaging and entertaining as possible, for example icons that relate to the genre of the music that is currently playing.

If supported by the iPod® Connector protocol, the firmware may also enable the user to "browse by letter" (BBL)—that is, jump to a specific element in a list by indicating the starting letter (rather than just "paging down" to it).

Additionally the MediaPod may support on-screen setup of the remote control to control the consumer's TV and Stereo.

Because the screen during music playback will be effectively static, the MediaPod may have a screensaver mode that will time out the GUI after a period of time in order to prevent screen burn-in. The screensaver will be enabled by default, but with the user option to disable.

All buttons on the remote control will support "press and hold" functionality (that is, when held they will continue to repeatedly send out the same IR signal) with a 30-second timeout. The MediaPod may respond to these repetitive signals as follows:
  Page up/down buttons—press and hold will cause accelerating page scroll
  Ok button—press and hold will add selected song or container to MediaPod-specific "on the go" playlist (queuing up jukebox-like functionality)
  Skip +/− buttons—press and hold will fast forward and rewind the currently playing song The MediaPod may output a video signal whenever it is powered on. If no iPod® is docked the video out will indicate that "no iPod® is present". Likewise, when the MediaPod is powered off, no video signal should be output.

The MediaPod may support multiple languages and may auto-detect the language that the currently docked iPod® is set to. Alternatively, language selection may be user-selectable.

If supported by the iPod® Extended Protocol, the MediaPod may be configured to control photo slideshows from an iPod® Photo.

While exemplary embodiments of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalents thereof.

All patents, patent applications, and other references cited within this document are hereby incorporated by reference in their entirety.

What is claimed is:

1. A method for providing a link between a digital media player, a display device, and a remote control, the method comprising:
   storing in a memory of an adapter a first data;
   receiving directly from the digital media player via a first interface of the adapter a second data;
   causing the adapter to use the first data and the second data to generate a first user interface in which a one of a plurality of digital media stored on the digital media player is indicated as being selectable for rendering by the digital media player;
   providing via a second interface of the adapter directly to the display device the first user interface;
   receiving directly from the remote control via a third interface of the adapter a user interface navigation command transmission;
   using by the adapter the user interface navigation command transmission received from the remote control via the third interface of the adapter to transmit directly to the digital media player via the first interface of the adapter a command having data which, when received by the digital media player, will cause the digital media player to generate a third data;
   receiving directly from the digital media player via a first interface of the adapter the third data;
   causing the adapter to use the first data and the third data to generate a second user interface in which a different one of the plurality of media stored on the digital media player is indicated as being selectable for rendering by the digital media; and
   providing via the second interface of the adapter directly to the display device the second user interface.

2. The method as recited in claim 1, comprising releasably coupling the first interface of the adapter to the digital media player and releasably coupling the second interface of the adapter to the display device.

3. The method as recited in claim 1, wherein the first data comprises album artwork data.

4. The method as recited in claim 3, comprising downloading the first data to the adapter directly from the digital media player via the first interface of the adapter.

5. The method as recited in claim 3, comprising downloading the first data to the adapter from a computer via a fourth interface of the adapter.

6. The method as recited in claim 1, wherein the display device comprises a television.

7. The method as recited in claim 1, wherein the digital media player comprises an iPod®.

8. The method as recited in claim 6, wherein the second data and the third data received via the first interface comprises text serial interface data.

9. The method as recited in claim 1, comprising receiving directly from the remote control via the third interface of the adapter a further command transmission and using by the adapter the further command transmission received from the remote control via the third interface of the adapter to transmit directly to the display device via a fourth interface of the adapter a command having data which, when received by the display device, will cause the display device to a transition from a first operating state of the display device to a second operating state of the display device.

10. The method as recited in claim 9, wherein the fourth interface comprises an IR blaster.

11. The method as recited in claim 1, comprising causing the adapter to issue to the remote control a communication for configuring the remote control to communicate with the adapter via the third interface of the adapter.

12. The method as recited in claim 1, comprising providing a recharging current to the digital media player via the first interface of the adapter when the digital media player is in coupled to the first interface of the adapter.

\* \* \* \* \*